United States Patent
Chen et al.

(10) Patent No.: US 6,950,406 B2
(45) Date of Patent: Sep. 27, 2005

(54) METHOD AND APPARATUS FOR CONTROLLING TRANSMISSION POWER IN A POTENTIALLY TRANSMISSION GATED OR CAPPED COMMUNICATION SYSTEM

(75) Inventors: Tao Chen, San Diego, CA (US); Jack M. Holtzman, San Diego, CA (US); Keith Saints, San Diego, CA (US); Charles E. Wheatley III, Del Mar, CA (US); Fuyun Ling, San Diego, CA (US); Nagabhushana Sindhushayana, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 450 days.

(21) Appl. No.: 10/055,293

(22) Filed: Jan. 22, 2002

(65) Prior Publication Data

US 2002/0064135 A1 May 30, 2002

Related U.S. Application Data

(63) Continuation of application No. 09/239,454, filed on Jan. 28, 1999, now Pat. No. 6,373,823.

(51) Int. Cl.$^7$ .............................................. G01R 31/08
(52) U.S. Cl. ...................... 370/252; 455/69; 455/522
(58) Field of Search .......................... 370/252, 69, 522

(56) References Cited

U.S. PATENT DOCUMENTS

| | | | |
|---|---|---|---|
| 3,925,782 A | 12/1975 | Anderl et al. ............... 343/178 |
| 4,495,648 A | 1/1985 | Giger ........................... 455/73 |
| 4,613,990 A | 9/1986 | Halpern ........................ 455/33 |
| 4,777,653 A | 10/1988 | Bonnerot et al. .............. 455/69 |
| 4,811,421 A | 3/1989 | Havel et al. ................... 455/69 |
| 4,868,795 A | * 9/1989 | McDavid et al. ............. 455/69 |
| 4,870,698 A | 9/1989 | Katsuyama et al. ........... 455/67 |
| 5,056,109 A | 10/1991 | Gilhousen et al. ............. 375/1 |
| 5,093,840 A | 3/1992 | Schilling ........................ 375/1 |
| 5,107,487 A | 4/1992 | Vilmur et al. ................. 370/18 |
| 5,485,486 A | 1/1996 | Gilhousen et al. .......... 375/205 |
| 5,603,096 A | * 2/1997 | Gilhousen et al. ............. 455/69 |
| 5,604,730 A | * 2/1997 | Tiedemann, Jr. ............ 370/252 |
| 5,946,346 A | * 8/1999 | Ahmed et al. ............... 455/522 |
| 6,075,974 A | * 6/2000 | Saints et al. .................. 455/69 |
| 6,151,328 A | * 11/2000 | Kwon et al. ................. 370/252 |
| 6,373,823 B1 | * 4/2002 | Chen et al. .................... 455/69 |

FOREIGN PATENT DOCUMENTS

| | | |
|---|---|---|
| EP | 0748066 | 12/1996 |
| WO | 9845962 | 10/1998 |

* cited by examiner

*Primary Examiner*—Duc Ho
*Assistant Examiner*—Phuongchau Ba Nguyen
(74) *Attorney, Agent, or Firm*—Philip R. Wadsworth; Thien T. Nguyen

(57) ABSTRACT

A power control system for controlling the transmission power in a system wherein the transmission power may be gated or capped. The receiver employs a combination of closed loop and outer loop power control. The outer loop is frozen upon detection by the receiver that the signal has been capped or gated.

12 Claims, 6 Drawing Sheets

METHOD AND APPARATUS FOR CONTROLLING TRANSMISSION POWER IN A POTENTIALLY TRANSMISSION GATED OR CAPPED COMMUNICATION SYSTEM

CROSS REFERENCE

This application is a continuation of U.S. application Ser. No. 09/239,454, filed Jan. 28, 1999 now U.S. Pat. No. 6,373,823, entitled "Method and Apparatus for Controlling Transmission Power in a Potentially Transmission Gated or Capped Communication System" and currently assigned to the assignee of the present application.

BACKGROUND OF THE INVENTION

I. Field of the Invention

The present invention relates to communications. More particularly, the present invention relates to a novel and improved method and apparatus for controlling transmission power in a wireless communication system.

II. Description of the Related Art

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM", and U.S. Pat. No. 5,109,390 entitled "DIVERSITY RECEIVER IN A CDMA CELLULAR TELEPHONE SYSTEM", both assigned to the assignee of the present invention and incorporated by reference herein.

A method for transmission of speech in digital communication systems that offers particular advantages in increasing capacity while maintaining high quality of perceived speech is by the use of variable rate speech encoding. The method and apparatus of a particularly useful variable rate speech encoder is described in detail in U.S. Pat. No. 5,414,796, entitled "VARIABLE RATE VOCODER", assigned to the assignee of the present invention and incorporated by reference herein.

The use of a variable rate speech encoder provides for data frames of maximum speech data capacity when said speech encoding is providing speech data at a maximum rate. When a variable rate speech coder is providing speech data at a less that maximum rate, there is excess capacity in the transmission frames. A method for transmitting additional data in transmission frames of a fixed predetermined size, wherein the source of the data for the data frames is providing the data at a variable rate is described in detail in U.S. Pat. No. 5,504,773, entitled "METHOD AND APPARATUS FOR THE FORMATTING OF DATA FOR TRANSMISSION", assigned to the assignee of the present invention, of which the disclosure thereof is incorporated by reference herein. In the above mentioned patent application a method and apparatus is disclosed for combining data of differing types from different sources in a data frame for transmission.

In frames containing less data than a predetermined capacity, power consumption may be lessened by transmission gating a transmission amplifier such that only parts of the frame containing data are transmitted. Furthermore, message collisions in a communication system may be reduced if the data is placed into frames in accordance with a predetermined pseudorandom process. A method and apparatus for gating the transmission and for positioning the data in the frames is disclosed in U.S. Pat. No. 5,659,569, entitled "DATA BURST RANDOMIZER", assigned to the assignee of the present invention, of which the disclosure thereof is incorporated by reference herein.

A useful method of power control of a mobile in a communication system is to monitor the power of the received signal from the mobile station at a base station. The base station in response to the monitored power level transmits power control bits to the mobile station at regular intervals. A method and apparatus for controlling transmission power in this fashion is disclosed in U.S. Pat. No. 5,056,109, entitled "METHOD AND APPARATUS FOR CONTROLLING TRANSMISSION POWER IN A CDMA CELLULAR MOBILE TELEPHONE SYSTEM", assigned to the assignee of the present invention, of which the disclosure thereof is incorporated by reference herein.

In a communication system that provides data using a QPSK modulation format, very useful information can be obtained by taking the cross product of the I and Q components of the QPSK signal. By knowing the relative phases of the two components, one can determine roughly the velocity of the mobile station in relation to the base station. A description of a circuit for determining the cross product of the I and Q components in a QPSK modulation communication system is disclosed in U.S. Pat. No. 5,506,865, entitled "PILOT CARRIER DOT PRODUCT CIRCUIT", assigned to the assignee of the present invention, the disclosure of which is incorporated by reference herein.

There has been an increasing demand for wireless communications systems to be able to transmit digital information at high rates. One method for sending high rate digital data from a remote station to a central base station is to allow the remote station to send the data using spread spectrum techniques of CDMA. One method that is proposed is to allow the remote station to transmit its information using a small set of orthogonal channels, this method is described in detail in copending U.S. patent Ser. No. 08/886,604, entitled "HIGH DATA RATE CDMA WIRELESS COMMUNICATION SYSTEM", assigned to the assignee of the present invention and incorporated by reference herein.

SUMMARY OF THE INVENTION

The present invention is a novel and improved power control system for use in a communication system in which the transmission energy may be gated or capped or closed loop power control commands otherwise ignored without the knowledge of the transmitter of those power control commands. The present invention is illustrated in the context of controlling forward link transmission power. It will be understood by one skilled in the art that the present invention is equally applicable to controlling the reverse link transmission power and that the invention is in no way limited to the application of forward link power control. Simply, by exchanging the references of the mobile station to references of a base station and changing references of the base station to references to the mobile station, a reverse link power control system is described.

In mobile station 7, the forward link signals 3 are received and demodulated. In addition, the mobile station determines the adequacy of the received signal power of forward link signals 3. In accordance with the determined adequacy of the received signal energy of forward link signals 3, mobile station 7 generates a series power control commands. In the exemplary embodiment, the power control commands consist of a series of simple up/down commands to which base station 1 responds by increasing or decreasing the transmission energy of forward link signals 3. The present invention is equally applicable to the generation of other forms of closed loop power control, such as the generation of power control commands that are indicative of the amount of change to the transmission power of forward link signals 3.

In the exemplary embodiment, power control commands are generated by comparing the received signal to interference ratio (SIR) of forward link signals 3 to at least one signal to interference ratio threshold. In the exemplary embodiment, a single signal to interference ratio threshold is used in the generation of a one bit power control command. The signal to energy ratio threshold is set to provide a desired performance level, such as a desired frame error rate or symbol error rate. This desired performance level may vary based upon the type of service being provided on forward link signal 3. When the performance level of the received forward link signal 3 varies from the desired performance level, the signal to interference ratio threshold is changed.

If the performance level of the received signal is less than the desired performance level, then the signal to interference ratio threshold is increased which will result in an increase in the received energy of forward link signals 3. Conversely, if the performance level of the received signal is greater than the desired performance level, then the signal to interference ratio threshold is decreased. It may seem counter intuitive to speak of a received signal being of too great a quality, but it should be remembered that this excess quality represents unnecessary energy employed in the transmission of forward link signals 3, which results in degradation of service to all other mobile stations served by base station 1 and to a reduction in the number of mobile station capable of being served by base station 1.

The varying of the signal to interference ratio thresholds based on measured performance metrics is referred to as outer loop power control. The feedback of power control commands based on comparing the measured signal to interference ratio to the variable threshold is referred to as closed loop power control. The combination of closed loop and outer loop power control is contemplated in both the ETSI UTRA candidate submission and the TIA cdma2000 candidate submission. The combination of closed loop power control and open loop power control is described in detail in aforementioned U.S. Pat. No. 5,056,109.

Mobile station 7 generates the power control commands and transmits them along with traffic data, pilot symbol data back to base station 1 on reverse link signals 5. In the exemplary embodiment, reverse link signals 5 are CDMA signals. In particular, in the exemplary embodiment, reverse link signals 5 are CDMA signals transmitted in accordance with the description in both the ETSI UTRA candidate submission and the TIA cdma2000 candidate submission. The reverse link signals for these two submissions are essentially identical for the purposes of the present invention. It should be understood that the present invention is equally applicable to other forms of CDMA signals and to other modulation schemes such as TDMA or GSM modulation schemes.

Base station 1 receives the power control commands from mobile station 7, and in response to those commands increases or decreases the transmission energy of forward link signals 3. However, there may be times when base station 1 does not respond to the power control commands from mobile station 7. For example, base station 1 may not increase the energy of forward link signals 3 in response to power control commands from mobile station 7, when base station 1 determines that it cannot allocate additional energy for the transmission to forward link signals 3 without causing unacceptable degradation to the transmission of signals to other mobile stations served by base station 1.

When base station 1 does not respond to the power control commands from mobile station 7, it can either continue transmitting at the present transmission energy of forward link signals 3 (referred to herein in as "capping" the energy of forward link signals 3) or it can temporarily gate off the transmission of forward link signals 3 (referred to herein in as "gating" the energy of forward link signals 3). When the energy of forward link signals 3 is either capped or gated, reception of those frames or symbols transmitted at the capped or gated energy in error may be unreliable.

Under traditional implementations, in response to the reception of the capped or gated frames or symbols, mobile station 7 will erroneously increase its signal to interference ratio threshold in the outer loop power control adjustment described above. This adjustment must be inhibited because the cause of the frame or symbols errors is not a result of mobile station 7 sending incorrect power control commands but rather because base station 1 is ignoring those commands and this is not within the control of mobile station 7. The present invention addresses this problem of controlling adjustment of the outer loop power control system in the presence of potentially gated or capped signals.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Outer Loop Control in a Potentially Gated or Capped Transmission System

Figure 1:
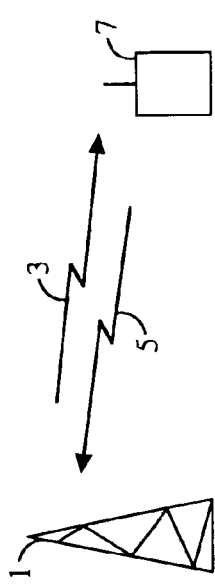
FIG. 1 is a block diagram illustrating the two basic components of a wireless communication system the base station and the mobile station.

Referring to FIG. 1, a wireless communication system is illustrated in which base station 1 transmits a wireless communication signal 3 to mobile station 7. Transmissions from base station 1 to mobile station 7 are referred to as forward link transmissions. In the exemplary embodiment, the wireless communication signals 3 and 5 are transmitted using a code division multiple access (CDMA) modulation. The generation of CDMA signals is well known in the art and is described in detail in the aforementioned U.S. Pat. Nos. 4,901,307 and 5,103,459 and is standardized in Telecommunications Industry Association Interim Standard TIA/EIA/IS-95-A, entitled "MOBILE STATION-BASE STATION COMPATIBILITY STANDARD FOR DUAL-MODE WIDEBAND SPREAD SPECTRUM CELLULAR SYSTEM" (hereafter the proposed IS-95 standard). The present invention is equally applicable to all wireless communication systems employing a combined closed loop and outer loop power control system.

The Telecommunications Industry Association proposed an evolution of the IS-95 standard that provides for high speed data transmission in its submission to the ITU entitled "THE CDMA2000 ITU-R RTT CANDIDATE SUBMISSION". Similarly, the European Telecommunications Standards Industry (ETSI) has proposed an alternative evolution of second generation CDMA systems in its proposal to the ITU entitled "THE ETSI UMTS TERRESTRIAL ACCESS (UTRA) ITU-R RTT CANDIDATE SUBMISSION". The present invention is particularly well suited for application to high rate CDMA communication systems, because the transmission of high speed data in a wireless communication system results more frequently in the inability to provide sufficient transmission power to reliably transmit the data. Thus, in the exemplary embodiment, the forward link signals 3 are CDMA high speed data signals as described in the cdma2000 and UTRA proposals. It will be understood by one skilled in the art that the present invention is also applicable to other wireless communication systems.

In the exemplary embodiment, forward link communications signals 3 include: pilot signals to allow for coherent demodulation by mobile station 7, primary traffic data, supplemental high speed data and power control signals. It will understood by one skilled in the art that the list of information transmitted within forward link signals 3 is not all inclusive, nor need all the information listed be present in order to apply the present invention. Moreover, it will be understood that the present invention is equally applicable to power control of the reverse link signals.

In mobile station 7, the forward link signals 3 are received and demodulated. In addition, mobile station 7 determines the adequacy of the received signal power of forward link signals 3. In accordance with the determined adequacy of the received signal energy of forward link signal 3, mobile station 7 generates a series of power control commands. In the exemplary embodiment, the power control commands consist of a series of one bit up/down commands to which base station 1 responds by increasing or decreasing the transmission energy of forward link signals 3. The present invention is equally applicable to the generation of other forms of closed loop power control, such as the generation of power control commands that are indicative of the amount of change to the transmission power of forward link signals 3.

In the exemplary embodiment, power control commands are generated by comparing the estimated received signal to interference ratio (SIR) of forward link signals 3 to a signal to interference ratio threshold. The signal to interference ratio threshold is set so as to provide for a desired performance level, such as a desired frame error rate or symbol error rate. This desired performance level may vary based upon the type of service being provided on forward link signal 3. When the performance level of the received forward link signal 3 varies from the desired performance level, the signal to interference ratio threshold is changed.

If the performance level of the received signal is less than the desired performance level, then the signal to interference ratio threshold is increased. Conversely, if the performance level of the received signal is greater than the desired performance level, then the signal to interference ratio threshold is decreased. It may seem counter intuitive to speak of a received signal being of too great a quality, but it should be remembered that this excess quality represents unnecessary energy employed in the transmission of forward link signals 3, which results in degradation of service to all other mobile stations served by base station 1 and to a reduction in the number of mobile stations capable of being served by base station 1.

The varying of the signal to interference ratio thresholds based on measured performance metrics is referred to as outer loop power control. The feedback of power control commands based on comparing the measured signal to interference ratio to the variable threshold is referred to as closed loop power control. The combination of closed loop and outer loop power control is contemplated in both the ETSI UTRA candidate submission and the TIA cdma2000 candidate submission. The combination of closed loop power control and open loop power control is described in detail in aforementioned U.S. Pat. No. 5,056,109.

Mobile station 7 generates the power control commands and transmits them along with traffic data, pilot symbol data back to base station 1 on reverse link signals 5. In the exemplary embodiment, reverse link signals 5 are CDMA signals. In particular, in the exemplary embodiment, reverse link signals 5 are CDMA signals transmitted in accordance with the description in either the ETSI UTRA candidate submission or the TIA cdma2000 candidate submission. The reverse link signals for these two submissions are essentially identical for the purposes of the present invention. It should be understood that the present invention is equally applicable to other forms of CDMA signals and to other modulation schemes such as TDMA or GSM modulation schemes.

Base station 1 receives the power control commands from mobile station 7, and in response to those commands increases or decreases the transmission energy of forward link signals 3. However, there may be times when base station 1 does not respond to the power control commands from mobile station 7. For example, base station 1 may not increase the energy of forward link signals 3 in response to power control commands from mobile station, when base station 1 determines that it cannot allocate additional energy for the transmission of forward link signals 3 without causing unacceptable degradation to the transmission of signals to other mobile stations served by base station 1.

When base station 1 does not respond to the power control commands from mobile station 7, it can either continue transmitting at the present transmission energy of forward link signals 3 (referred to herein in as "capping" the energy of forward link signals 3) or it can temporarily gate off the transmission of forward link signals 3 (referred to herein in as "gating" the energy of forward link signals 3). When the energy of forward link signals 3 is either capped or gated, reception of those frames or symbols transmitted at the capped or gated energy in error is unreliable.

In response to the reception of the capped or gated frames or symbols, mobile station 7 will erroneously increase its signal to interference ratio threshold in the outer loop power control adjustment described above. This adjustment must be inhibited because the cause of the frame or symbols errors is not a result of mobile station 7 sending incorrect power control commands but rather because base station 1 is ignoring those commands and this is not within the control of mobile station 7. The present invention addresses this problem of controlling adjustment of the outer loop power control system in the presence of potentially gated or capped signals.

Figure 2:
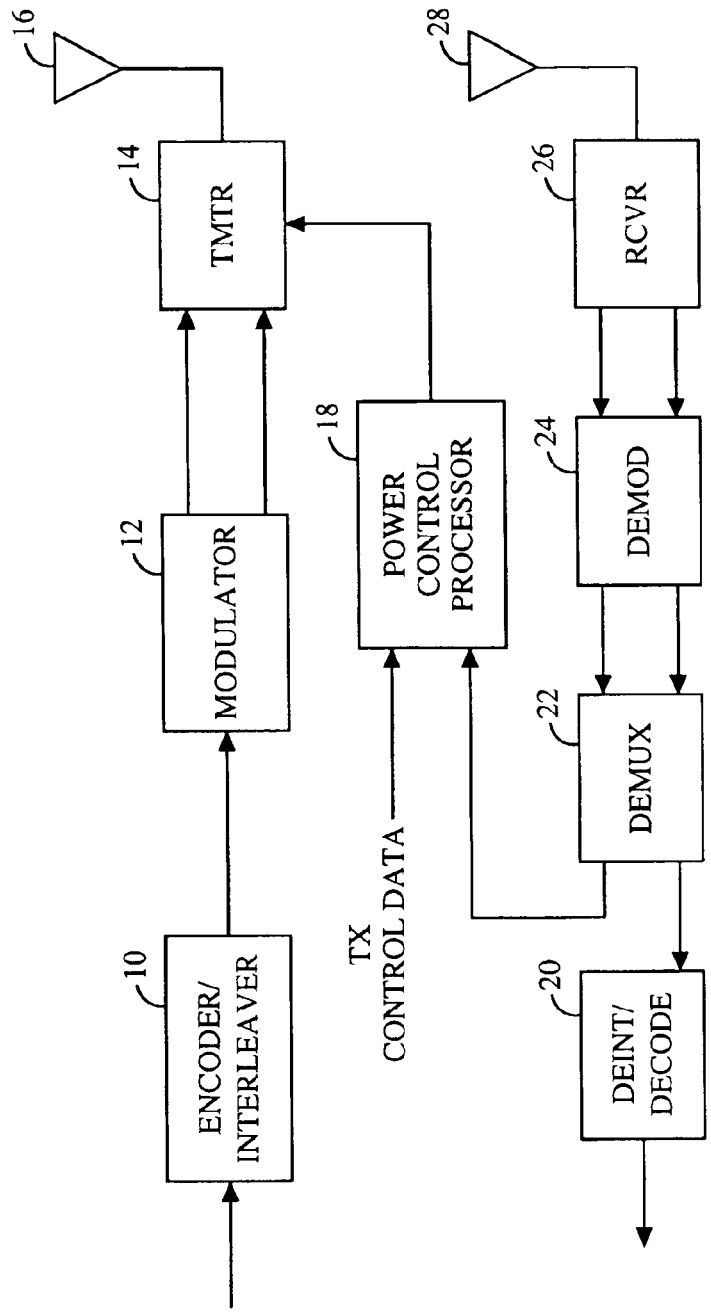
FIG. 2 is a block diagram of the base station of the present invention.

FIG. 2 illustrates a simplified block diagram of base station 1. Information for transmission on forward link signals 3 is provided to encoder/interleaver 10, which provides forward error correction on the data and then reorders the symbols in accordance with a predetermined interleaver format to provide time diversity in the transmitted signal. The interleaved encoded symbols are provided to modulator 12. In the exemplary embodiment, modulator 12 is a CDMA modulator, the design and implementation of which is known in the art and is described in detail in the aforementioned U.S. Pat. Nos. 4,901,307 and 5,103,459. In particular, in the exemplary embodiment, modulator 12 is a CDMA modulator capable of transmitting high speed data such as is described in the aforementioned UTRA and cdma2000 specifications.

The modulated signal is provided to transmitter (TMTR) 14, which up converts, amplifies and filters the signal for transmission. In the exemplary embodiment, transmitter 14 modulates the signals for transmission using a quaternary phase shift keying (QPSK) modulation format. The present invention is applicable to any form of modulation, such as BPSK, QAM or FSK modulation. The modulated signals are amplified to a level of transmission energy in accordance with a power control signal from power control processor 18. The QPSK signal is provided from transmitter 14 for transmission through antenna 16 as forward link signals 3.

Figure 3:
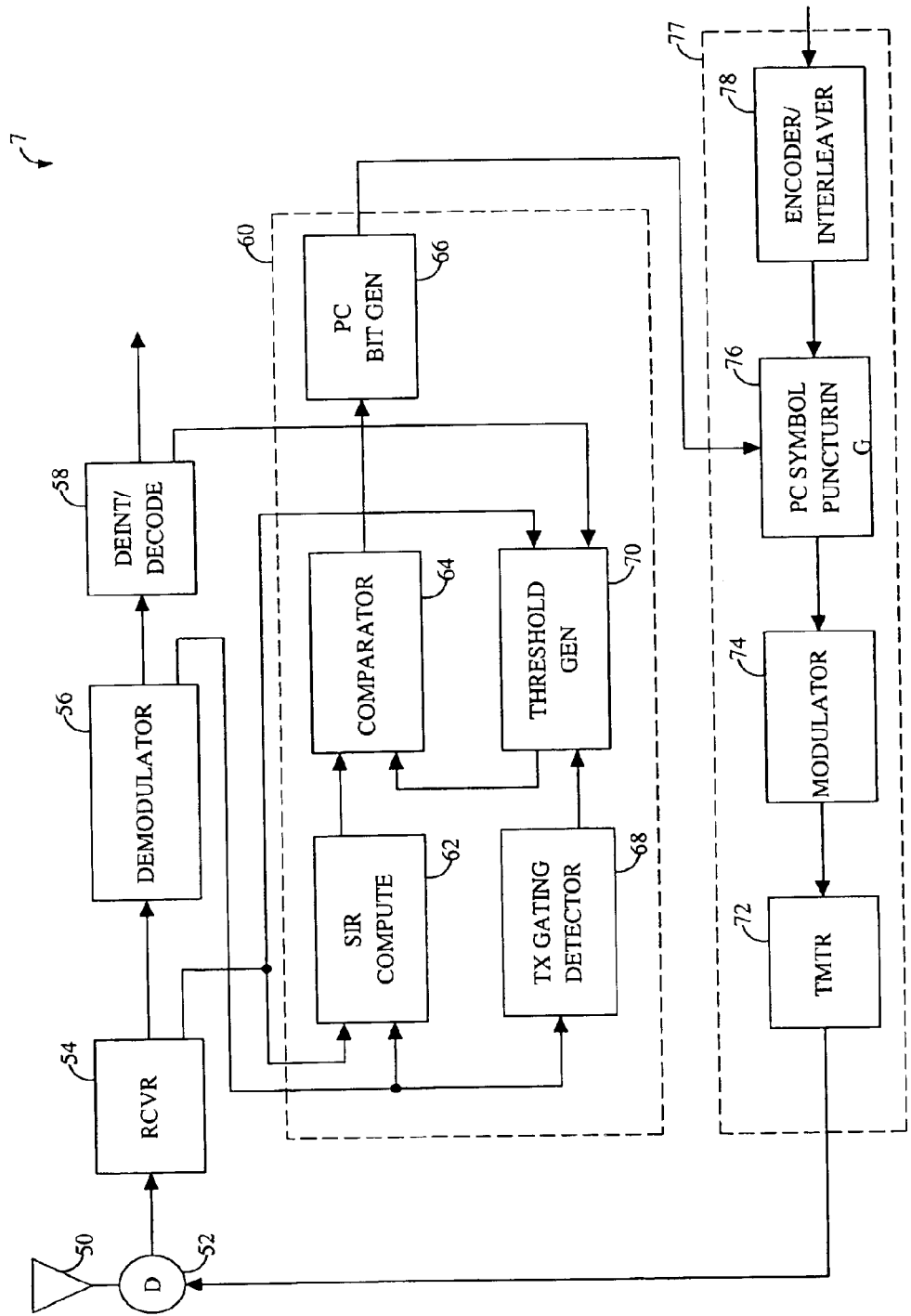
FIG. 3 is a block diagram of the mobile station of the present invention.

Turning to FIG. 3, the forward link signals 3 are received by mobile station 7 at antenna 50 and are provided through duplexer 52 to receiver (RCVR) 54. Receiver 54 down converts, filters and amplifies the received signal and provides the received signal to demodulator 56. In addition, receiver 54 provides an indication of the in-band energy to signal to interference ratio computation element 62 and to transmission gating detector 68, the operation of which are described later herein.

Demodulator 56 demodulates the received signal and provides the demodulated symbol data to de-interleaver/decoder 58. De-interleaver/decoder 58 reorders the demodulated symbols and decodes the reordered symbols in accordance with a predetermined error correction format such as a convolutional decoding or turbo decoding format and provides the decoded data stream to the user of mobile station 7 or for further processing prior to provision to the user of mobile station 7. In addition, de-interleaver/decoder 58 provides a signal indicative of whether the frame was able to be reliably decoded or alternatively an indication of the symbol error rate in the decoded frame of data to threshold generator 70.

In the exemplary embodiment, information from receiver 54 and from demodulator 56 is provided to forward link power control processor 60. Signal to interference ratio (SIR) computation element 62 estimates the signal to interference ratio of forward link signal 3.

A simplistic method of computing signal to interference ratio would be to assume that all in-band energy is representative of the interference energy. Because receiver 54 would typically include an automatic gain control element that normalizes the signal based on the amount of in band energy, this value can be provided directly from receiver 54 to signal to interference ratio (SIR) computation element 62. Demodulator 56 demodulates the received signal and extracts the forward link signal 3 from signals that are intended for transmission to other mobile stations served by base station 1. The energy of the demodulated symbols are summed to provide a signal energy estimate. The signal energy estimate provided is then divided by the in band energy value to provide a rough estimate of the signal to interference ratio.

In the exemplary embodiment, forward link signal 3 is a variable rate transmission signal wherein the rate is unknown a priori to mobile station 7. In the exemplary variable rate forward link signal 3, each transmitted signal is repeated within the transmission signal as many times as possible to fill a fixed length frame of data. More importantly for purposes of the present invention, the energy of the signal is varied in inverse proportion to the amount of repetition in forward link signal 3. This results in a constant symbol energy and approximately uniform performance across the rates.

This complicates the estimation of the signal energy because the symbol energy is spread across time and, in order to determine the sufficiency of the symbol energy, the signal energy estimation algorithm must have a fixed reference that does not vary with the unknown rate of the information. In the exemplary embodiment, power control bits are punctured into forward link signal 3 and the energy of these bits is set at a fixed relation to the energy used in the transmission of the maximum rate information signal.

These non rate varying power control symbols can be used in one of two ways. They can either be used to make a preliminary estimation of the rate of the information signal by estimating the ratio between the fixed energy power control symbols. The energy of the traffic data a preliminary estimate of the rate of the traffic data can be made and this can be used to modify the computed traffic energy for comparison with a single non varying signal to interference ratio threshold. Alternatively, the preliminary rate estimation can be used such that the signal to interference ratio is compared to a set of rate dependent thresholds.

An alternative method for using the power control bits that have a fixed transmission energy relationship to the transmission energy of the maximum rate information signal is to use the power control bits themselves to compute the signal energy. Under this method the energies of the power control bits represent the signal energy and this energy is computed and used directly in the computation of the signal to interference.

Another difficulty in computing the signal to interference ratio of the received CDMA signal is a result of the orthogonality of single path signals from base station 1 to mobile station 7. The problem is that the in band energy does not accurately represent the interference energy in a strong single path reception scenario such as when mobile station 7 is in line of sight of base station 1. The in band energy will include energy that is orthogonal to forward link signals 3 and the orthogonal energy does not contribute to the interference limiting noise because it can be entirely eliminated in the demodulator.

In the exemplary embodiment, each base station modulates the signal by first spreading the data in accordance with an orthogonal channelization and then spreading the resultant orthogonally spread data in accordance with a pseudo noise (PN) sequence. PN sequences include Gold codes and maximal length codes the generation of which is well known in the art. One method of dealing with the additional complexity of orthogonal in band energy is to remove the PN spreading and to compute the energy of the despread signal. This energy can then be subtracted from the in band energy to provide an estimate of the estimate of the noise signal. Another method is computing the variance on a fixed energy signal that is part of forward link signal 3, such as a fixed energy pilot signal.

The complexities of computing the signal to interference ratio in a variable rate CDMA signal using orthogonal spreading is addressed in U.S. Pat. No. 5,903,554, filed Sep. 27, 1996, entitled "METHOD AND APPARATUS FOR MEASURING LINK QUALITY IN A SPREAD SPECTRUM COMMUNICATION SYSTEM", disclosure of which is assigned to the assignee of the present invention and incorporated by reference herein. It will be understood by one skilled in the art that the present invention is equally applicable to any method for computing the signal quality metric that is used to compare against the threshold value.

Signal to interference ratio computational element 62 provides the signal to interference ratio estimate to comparator 64. In comparator 64 the signal to interference ratio estimate is compared against the signal to interference ratio threshold. In the exemplary embodiment, a single threshold is used and a single bit is provided from comparator 64 indicative of whether the signal to interference estimate is greater than or less than the signal to interference ratio threshold. This single power control bit is provided to power control bit generator (PC BIT GEN). PC bit generator 66 generates a power control command in accordance with the comparison by comparator 64. The power control command is provided to the transmission subsystem 77 of mobile station 7 for transmission on reverse link signal 5.

As stated above, de-interleaver/decoder 58 provides a signal indicative of whether the frame was correctly decoded or whether a frame erasure was declared. Threshold generator 70 compiles a statistic of the frame error rate or other metric such as symbol error rate. In normal operation, when the frame error rate rises above the desired frame error rate threshold, generator 70 increases the signal to interference threshold and provides the new higher threshold value to comparator 64. Alternatively, in normal operation, when the frame error rate falls below the desired frame error rate threshold, generator 70 lowers the signal to interference threshold and provides the new lower threshold value to comparator 64.

However, in the present invention, when forward link signal 3 is detected to be capped or gated by transmission gating detector 68, transmission gating detector 68 sends a signal to threshold generator 70 stopping its threshold updating operation and preventing any update of the frame error rate statistic of threshold generator 70.

In the exemplary embodiment, transmission gating detector 68 detects gating of forward link signal 3 by computing the energy of the demodulated signal from demodulator 56. If the energy is below a predetermined noise threshold, then forward link signal 3 is declared to be gated off and the operation of threshold generator 70 is suspended. In the exemplary embodiment, transmission gating detector 68 detects signal capping by recognizing an absence of increase in the energy of forward link signals 3 in response to a series of "up" commands being sent back to base station 1. After a predetermined number of "up" commands have failed to increase the received energy of forward link signals 3, forward link signal 3 is declared to be capped and the operation of threshold generator 70 is suspended.

Returning to the operation of reverse link transmission subsystem 77, information for transmission on reverse link signals 5 is provided to encoder/interleaver 78, which provides forward error correction on the data and then reorders the symbols in accordance with a predetermined interleaver format to provide time diversity in the transmitted signal. The interleaved encoded symbols are provided to power control puncturing element 76, which punctures the power control symbols into the outgoing data. The signal is then provided to modulator 74. In the exemplary embodiment, modulator 74 is a CDMA modulator, the design and implementation of which is known in the art and is described in detail in the aforementioned U.S. Pat. Nos. 4,901,307 and 5,103,459. In particular, in the exemplary embodiment, modulator 74 is a CDMA modulator capable of transmitting high speed data such as is described in the aforementioned UTRA and cdma2000 specifications and is described in further detail in aforementioned copending U.S. patent application Ser. No. 08/886,604.

The modulated signal is provided to transmitter (TMTR) 72, which up converts, amplifies and filters the signal for transmission. In the exemplary embodiment, transmitter 72 modulates the signals for transmission using a quaternary phase shift keying (QPSK) modulation format. The present invention is applicable to any form of modulation, such as BPSK, QAM or FSK modulation. The QPSK signal is provided through duplexer 52 for transmission through antenna 50 as reverse link signals 5.

Returning to FIG. 2, reverse link signals 5 are received by base station 1 at antenna 28 and are provided through to receiver (RCVR) 26. Receiver 26 down converts, filters and amplifies the received signal and provides the received signal to demodulator 24. Demodulator 24 demodulates the received signal and provides the demodulated symbol data to de-multiplexer 22. De-multiplexer 22 separates the power control commands from the signal and provides those commands to power control processor 18.

The traffic data is provided to de-interleaver/decoder 20. De-interleaver/decoder 20 reorders the demodulated symbols and decodes the reordered symbols data in accordance with a predetermined error correction format such as a convolutional decoding or turbo decoding format and outputs the decoded data stream to a base station controller (not shown).

Under normal operation, power control processor 18 generates a new transmission power for the transmission of forward link signals 3 in accordance with the received power control commands. However, power control command processor 18 also determines the transmission energy of forward link signals 3 in accordance with transmission control data. The transmission control data will for example provide a maximum transmission energy for the transmission of forward link signals 3. When in response to the received power control commands, the transmission energy would exceed the allowed maximum transmission of the forward link signals 3, then the transmission energy of forward link signals 3 is either gated or capped and the operation proceeds as described above.

Figure 7:
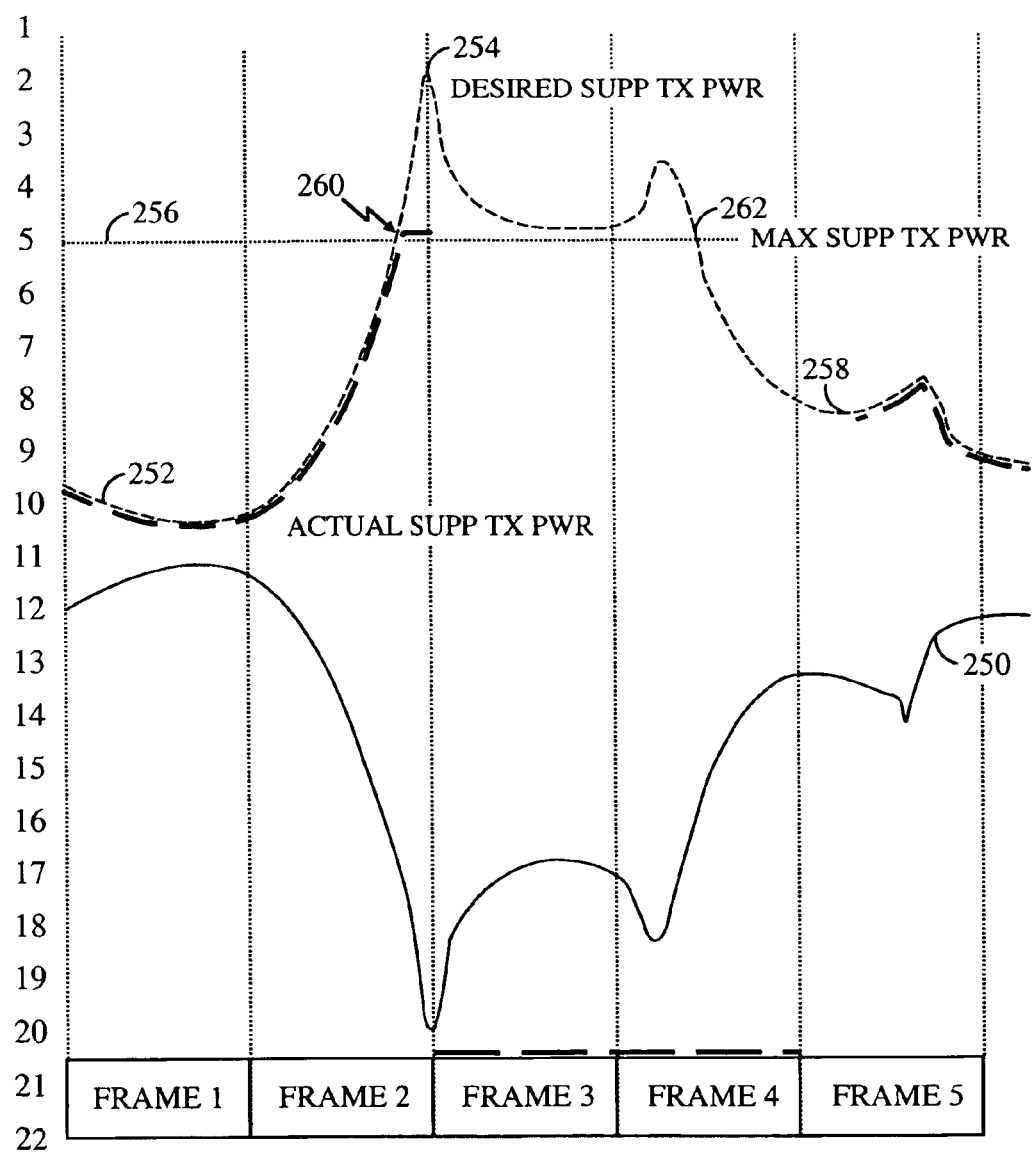
FIG. 7 is a timing diagram of power control operation of a base station for capped or gated signals.

FIG. 7 illustrates the operation of the base station in a capped and gated operation. Curve 250 illustrates the path quality between the base station and the mobile station. Curve 252 illustrates the transmission power in response to changes in the path quality. The transmission energy should inversely track the path quality or in other words the transmission energy should track the path loss. When the path loss is increased by an amount Δ, the transmission power should be increased by Δ. The horizontal line 256 represents the maximum transmit power of the base station. At this point, there is no remaining transmission power available.

In frame one, the desired transmission energy is always less than the maximum supply power. So in frame one the transmission energy can track the path loss. In frame 2 the path loss has increased to an extent that at point 260, the transmission energy can no longer track the path loss. At this point, in the exemplary embodiment, the transmission energy is capped which is represented by the flattening of the supplied transmission power and the separation between the actual supplied transmission power and the desired supplied transmission power.

It should be noted that it is the transmission energy of the dedicated forward link signals 3 that is capped. In an alternative embodiment, the portion of frame 2 following point 260 could be gated. In a second alternative embodiment, the transmission energy at the point beyond point 260 could depend on the point within the frame that the requested energy passed the threshold 256. For example, if the requested energy passed threshold 256 more than half way through the transmission of frame 2 then the energy would be capped. If the requested energy passed threshold 256 less than half way through the transmission of frame 2 then the energy would be gated.

In the exemplary embodiment, the dedicated forward link signals include the traffic channel signals and the power control commands. While the traffic channel signals are capped or gated, the power control commands are still transmitted by the base station at the desired supply power. That is to say, even beyond point 260, the reverse link power control commands transmitted by the base station are still tracking the desired supply power curve 254 or a curve of a fixed relation to the desired power curve 254. This means that the mobile station is capable of sending power control commands that track the path loss even when the transmission power of the traffic channel data is capped or gated.

Although base station 1 does not transmit the traffic data at the desired supply power, it still tracks the changes requested by the mobile station. In this fashion, base station 1 is capable of determining at point 262 where the desired supply power is less than the maximum supply power. In the exemplary embodiment, the fourth frame is gated in its entirety and the subsequent frame is transmitted at the desired supply power indicated by curve 258.

II. Outer Loop Control Based on Decoder Metrics and Accumulated Frame Energy

In this second embodiment of the present invention the outer loop is controlled by factors in addition to the frame error rate. In a first aspect of the second embodiment, before changing the outer threshold based on a frame error or a correctly received frame, the receiver determines whether the frame was received with accumulated energy over the frame in excess of the outer loop threshold.

If the frame was received correctly, the conventional response would be to incrementally reduce the SIR threshold. However, if the frame was received correctly but the accumulated energy over the frame was in excess of the threshold, then it is inappropriate to reduce the energy threshold. Conversely, if a frame is received in error, the conventional response would be to incrementally increase the SIR threshold. However, if the frame was received in error and the accumulated energy over the frame was less than the threshold SIR, then it is also inappropriate to increase the SIR threshold. Both of these responses are inhibited in the second embodiment of the present invention.

Moreover, the present invention will also provide a method for improving the amount of change in the outer loop SIR threshold. For example, if the frame was received correctly and the accumulated energy over the frame was below the threshold in excess of a predetermined amount, then the threshold should be lowered by an amount greater than the amount that the threshold should be lowered should the frame have been received correctly and the frame energy is at the threshold amount. Conversely, if the frame was received in error and the accumulated energy over the frame was in excess of the threshold more than a predetermined amount, then the threshold should be increased by an amount greater than the amount that the threshold should be increased had the frame been received in error with an accumulated energy at the threshold amount.

Furthermore, the present invention will also provide a method for improving the amount of change in the outer loop SIR threshold in contradiction to the frame error rate when decoder metrics indicate that such a change is required. For example, if the frame was received correctly but the decoder metrics indicate that the decoder is very close to failing then either the adjustment of the outer loop will be frozen or the threshold will be increased.

Figure 4:
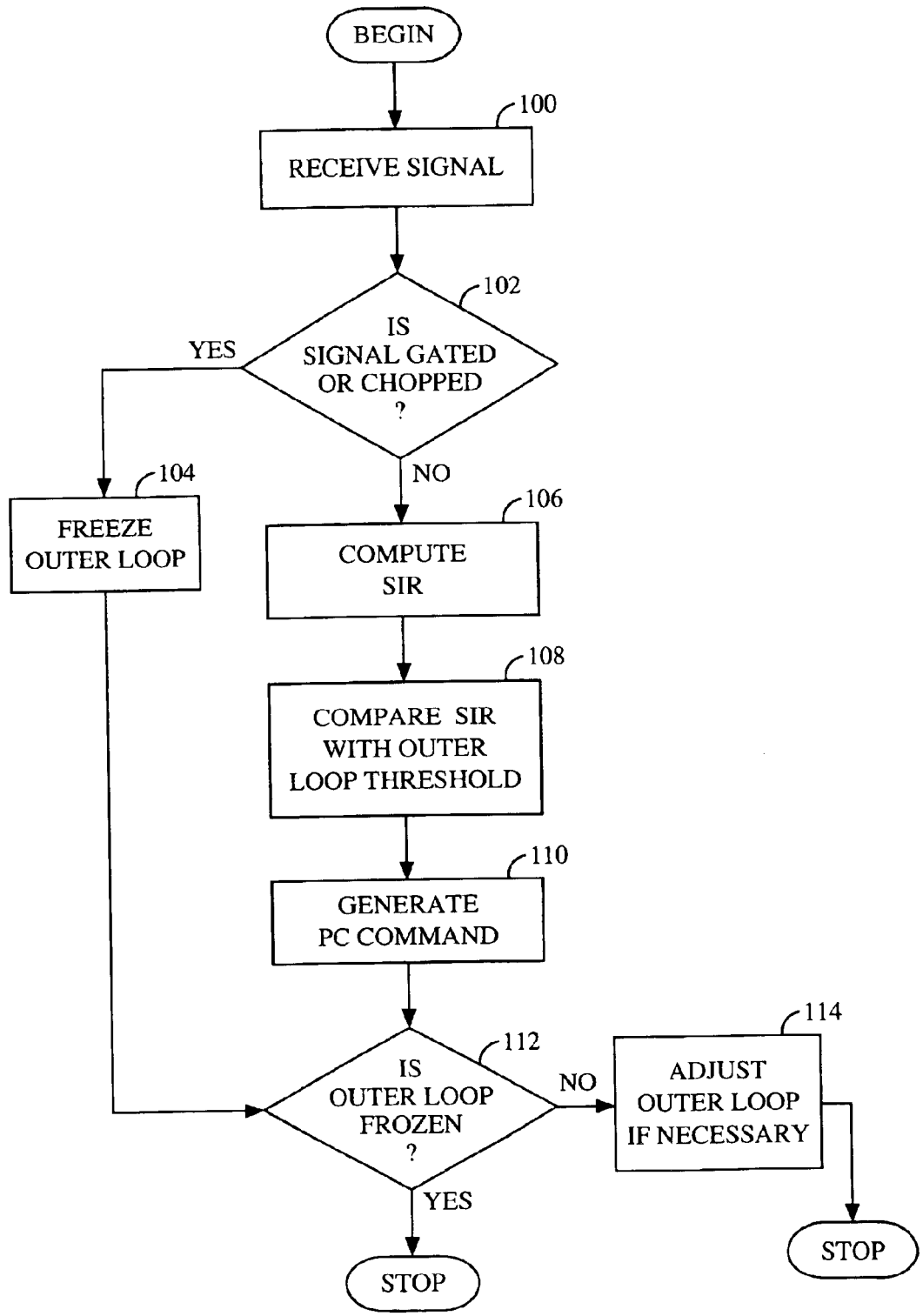
FIGS. 4–5 are flow diagrams of power control at a mobile station.

FIG. 4 is a flow diagram of operation of power control in the mobile station. At step 100 the mobile station receives the signal. At decision diamond 102, the mobile station determines if the signal is gated or chopped, i.e. capped. If the signal is not gated and is not chopped, the mobile station computes the SIR of the received signal at step 106 and compares the SIR with an outer loop threshold at step 108. The mobile station then generates a PC command at step 110. Returning to decision diamond 102, if the received signal is not gated or chopped, the processing continues to step 104 to freeze further outer loop calculations, i.e., stop adjusting SIR threshold. If the outer loop is frozen at decision diamond 112, the process stops. If the outer loop is not frozen at decision diamond 112, i.e. the mobile station is still adjusting SIR thresholds, processing continues to step 114 to adjust the outer loop if necessary.

Figure 5:
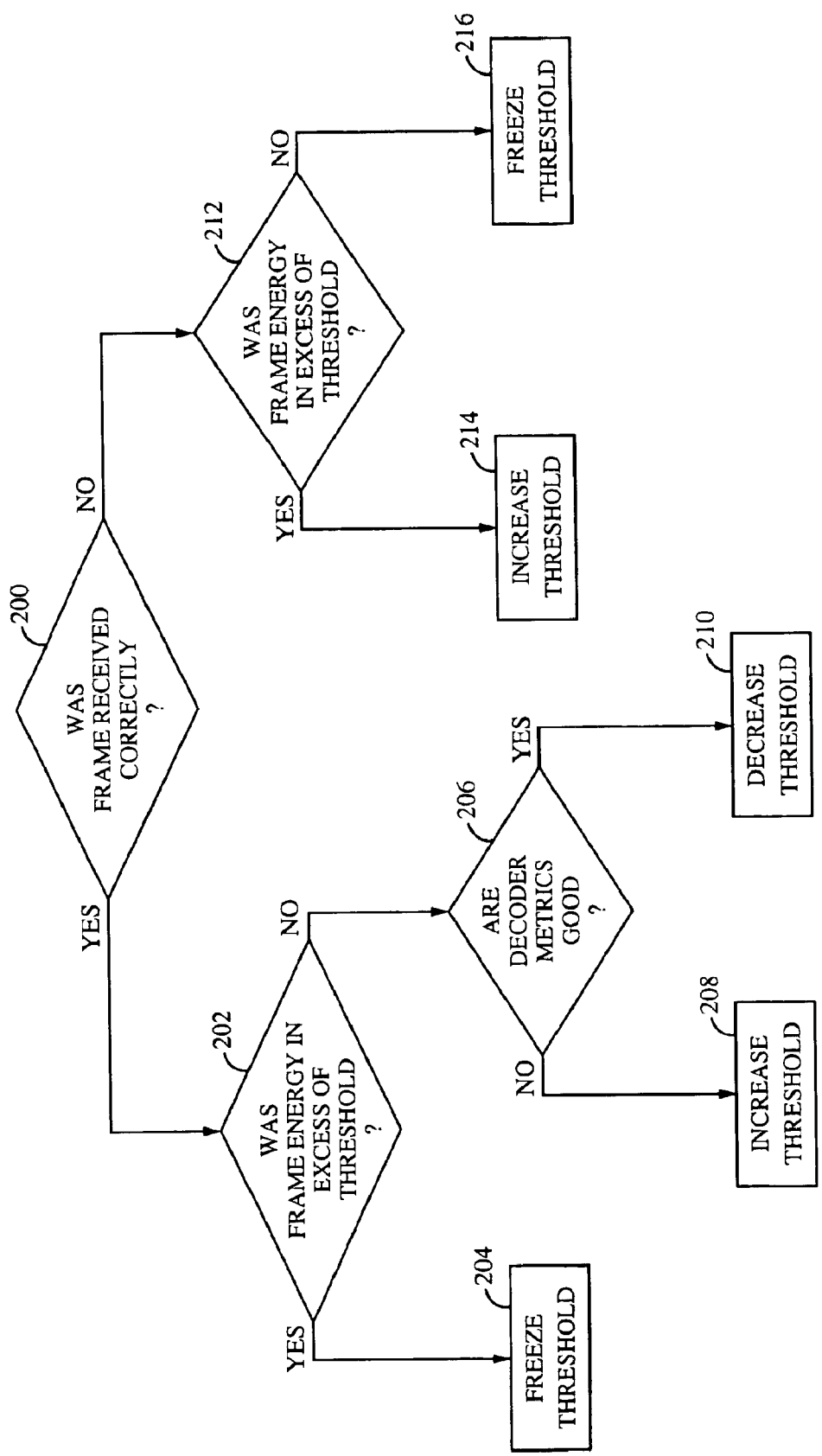

FIG. 5 is a flowchart implementing a simplified version of the present embodiment. The method used to determine changes in the SIR threshold will be described in conjunction with the receiver structure illustrated in FIG. 3. In block 200, de-interleaver/decoder 58 sends an indication to threshold generator 70 as to whether the frame was received correctly.

If the frame was received correctly, the process moves to block 202. Indication of the received energy is provided from receiver 54 to threshold generator 70. If the frame was received with an accumulated energy greater than an accumulated frame energy threshold, the SIR threshold is frozen. The reason for this is that the correct reception of the frame does not reflect the accuracy of the threshold, since the energy of the received frame was in excess of that threshold.

This can happen, for example, if the propagation path rapidly improves and the down commands from mobile station are inadequate to reduce the excess energy of the transmitted signal.

If the frame was not received with excess energy then the process moves to decision block 206. De-interleaver/decoder 58 sends an indication of the decoder metrics to threshold generator 70. The decoder metrics are an indication of how close the decoder is to failing to be able to decode the frame. Decoder metrics that are applicable include accumulated metrics in a trellis decoder, number of corrected symbol errors or the number of iterations required for successful decoding. If the decoder metrics are good indicating that the decoder is operating near its optimal decoding strength, then the threshold is increased in block 208. If the decoder metrics are bad indicating that the decoder is operating near its breaking point at which it will be unable to successfully decode the frame, then the threshold is increased in block 210.

Back in block 200, if the frame was received in error, then the process moves to block 212. Indications of the received energy are provided from receiver 54 to threshold generator 70. If the frame energy was in excess of the accumulated received frame energy threshold, then the process moves to block 214 and the SIR threshold is increased. If the received energy was less than the accumulated frame energy threshold, then the process moves to block 216 and the threshold is frozen.

Figure 6:
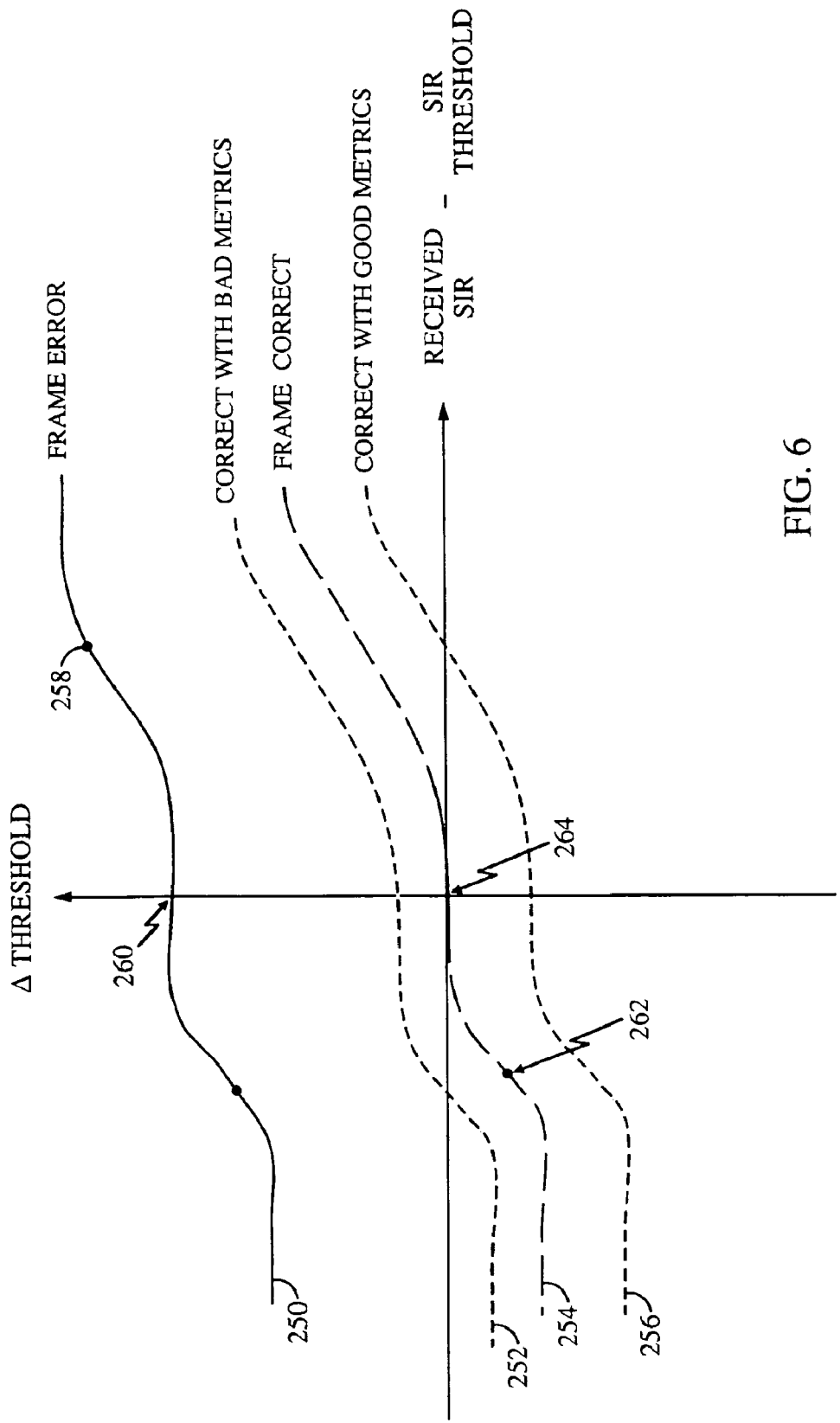
FIG. 6 is a timing diagram of power control operation at a mobile station.

FIG. 6 illustrates a preferred embodiment wherein the adjustments to threshold are based on the frame error rate, the received SIR of the frame and the decoder metrics, and in particular vary based on the received SIR. Points on the vertical axis represent the amount of adjustment to the threshold. Points below the horizontal axis represent decreases to the SIR threshold and points above the horizontal axis represent increases to the SIR threshold. Points on the horizontal axis represent the received SIR of the frame minus SIR threshold previously used. Points to the left of the vertical axis represent received frame SIR values less than the current SIR threshold and points to the right of the vertical axis represent received frame SIR values greater that the current SIR threshold.

There are four curves represented on the graph of FIG. 6. From which curve one extracts the amount of change to the SIR threshold depends on whether the frame was received in error and on the decoder metrics. If the frame was received in error the amount of change to the SIR threshold is selected from curve 250. If the frame was received correctly and the decoder metrics indicate that the decoder is operating near optimum decoding power, then the change to the SIR threshold is selected from curve 254. If the frame was received correctly and the decoder metrics indicate that the decoder is operating with very little margin, then the change to the SIR threshold is selected from curve 252. If the frame was received correctly and the decoder metrics indicate that the decoder is operating with more margin than desired, then the change to the SIR threshold is selected from curve 256.

At point 258 on curve 250, the frame was received in error and the received SIR was greater than the threshold by a significant amount. Thus, the change to the threshold is greater than the change to the threshold had the frame been received in error with the received SIR at the threshold value illustrated by point 260. At point 262, the frame is received correctly with nearly optimal decoder metrics and the received SIR is less than the threshold by a significant amount. Thus, the decrease in the SIR threshold is more than the decrease had the frame been received correctly with nearly optimal decoder metrics and the received SIR is at the threshold illustrated by point 264.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. An apparatus for controlling the transmission energy of signals received from a remote transmitter, comprising:

receiver for measuring an energy of the signals to produce an energy indication;

power control processor for generating a signal quality metric based on said measuring, generating closed loop power control commands in accordance with a comparison between the signal quality metric and a variable threshold, making a determination that the remote transmitter is not responding to the power control commands in a predetermined fashion, and suspending an updating of the variable threshold in accordance with said determination; and a demodulator for demodulating the signals and measuring demodulated symbol energies from symbols residing in said signals, and providing said demodulated symbol energies to said power control processor, wherein said power control processor generates said signal quality metric based on said demodulated symbol energies.

2. The apparatus of claim 1 wherein said signal quality metric is a signal to interference ratio, and wherein said power control processor comprises a signal to interference ratio computation element for generating said signal to interference ratio based on the energy indication.

3. The apparatus of claim 1 further comprising a decoder for decoding frames residing in said signals and generating frame error information, and providing said frame error information to said power control processor, and wherein said power control processor makes said determination based on said frame error information.

4. The apparatus of claim 1 further comprising a decoder for decoding frames residing in said signals and generating a decoder metric, and providing said decoder metric to said power control processor, and wherein said power control processor makes said determination based on said decoder metric.

5. The apparatus of claim 1 further comprising a decoder for decoding frames residing in said signals and generating a decoder metric and frame error information, and providing said decoder metric and frame error information to said power control processor, and wherein said power control processor makes said determination based on said decoder metric and frame error information.

6. A method of controlling a transmission energy of signals received from a remote transmitter, comprising:

measuring an energy of the signals to produce an energy indication; generating a signal quality metric based on said measuring;

generating closed loop power control commands in accordance with a comparison between the signal quality metric and a variable threshold;

making a determination that the remote transmitter is not responding to the power control commands in a predetermined fashion; suspending an updating of the variable threshold in accordance with said determination; and demodulating symbols residing in the signals to produce symbol energies, wherein said generating said signal quality metric is based on said demodulated symbol energies.

7. The method of claim 6 wherein said signal quality metric is a signal to interference ratio.

8. The method of claim 6 further comprising decoding frames residing in the signals to produce frame error information, wherein said making a determination is based on said frame error information.

9. The method of claim 6 further comprising decoding frames residing in the signals to produce a decoder metric, wherein said making a determination is based on said decoder metric.

10. The method of claim 6 further comprising decoding frames residing in the signals to produce a decoder metric and frame error information, wherein said making a determination is based on said decoder metric and frame error information.

11. The method of claim 6 wherein said making a determination comprises detecting a gating of the transmission energy of the signals based on said energy indication.

12. The method of claim 6 wherein said making a determination comprises recognizing an absence of increase in said energy indication in response to at least one of said closed loop power control commands.

* * * * *